United States Patent [19]

Forghieri

[11] Patent Number: 4,848,187
[45] Date of Patent: Jul. 18, 1989

[54] DRIVE FOR TRANSMITTING MOTION BETWEEN A DRIVE SHAFT AND A PAIR OF DRIVEN SHAFTS, IN PARTICULAR, THE FRONT AND REAR DRIVE SHAFTS OF A MOTOR VEHICLE

[75] Inventor: Mauro Forghieri, Magreta, Italy
[73] Assignee: Ferrari, S.p.A., Modea, Italy
[21] Appl. No.: 147,282
[22] Filed: Jan. 22, 1988
[30] Foreign Application Priority Data
  Jan. 23, 1987 [IT] Italy .............................. 67039 A/87
[51] Int. Cl.$^4$ .............................................. F16H 1/44
[52] U.S. Cl. ...................................... 74/711; 180/249; 74/718
[58] Field of Search ...................... 74/710.5, 711, 718, 74/714; 180/249

[56] References Cited

U.S. PATENT DOCUMENTS

| | | | |
|---|---|---|---|
| 3,238,813 | 3/1966 | Moan | 74/718 X |
| 3,653,279 | 4/1972 | Sebern | 74/710.5 |
| 3,869,940 | 3/1975 | Webb et al. | 74/711 |
| 3,923,113 | 12/1975 | Pagdin | 180/249 |
| 3,924,489 | 12/1975 | Yasuda | 74/718 X |
| 4,031,780 | 6/1977 | Dolan et al. | 180/249 X |

Primary Examiner—Dirk Wright
Attorney, Agent, or Firm—Shlesinger & Myers

[57] ABSTRACT

A drive comprising a power dividing unit located between the drive shaft and the driven shafts and designed to transmit the torque on the drive shaft to each driven shaft in such a manner that the torques acting on each of the same fall within a given torque ratio and such as to control the driven shafts at speeds depending on the operating conditions of the members connected to the shafts themselves. The two driven shafts are interconnected directly by a hydraulic coupling substantially comprising a first rotary member connected to one of the driven shafts, a second rotary member connected to the other driven shaft, and a tank for a hydraulic fluid; each of the aforementioned rotary members being provided with fluid conveying device designed to circulate fluid centrifugally between the fluid conveying device of the other rotary member when the speed of one driven shaft differs from that of the other, so as to transmit, via the aforementioned hydraulic coupling, a torque increasing alongside an increase in the difference between the speeds of the driven shafts themselves.

7 Claims, 3 Drawing Sheets

DRIVE FOR TRANSMITTING MOTION BETWEEN A DRIVE SHAFT AND A PAIR OF DRIVEN SHAFTS, IN PARTICULAR, THE FRONT AND REAR DRIVE SHAFTS OF A MOTOR VEHICLE

BACKGROUND OF THE INVENTION

The present invention relates to a drive for transmitting motion between a drive shaft and a pair of driven shafts, in particular, for controlling the front and rear drive shafts of a motor vehicle.

Known drives of the aforementioned type usually comprise a power dividing unit located between the drive shaft and the driven shafts and designed to transmit the torque on the drive shaft to each driven shaft in such a manner that the torques acting on each of the same fall within a given torque ratio and such as to control the two driven shafts at speeds depending on the operating conditions of the members connected to the shafts themselves.

On automobile drives, the said power divider usually consists of an epicyclic train comprising a pair of coaxial sun gears, each integral with one of the said driven shafts, and between which are located planet gears turning on the pins of a train carrier controlled by the drive shaft.

A train of the aforementioned type is known to divide the torques acting on the two driven shafts according to a constant ratio, regardless of the speeds of the shafts themselves, and depending solely on the ratio between the pitch circle radii of the said two sun gears. Furthermore, such a train permits the said driven shafts to operate at different speeds, depending on the speeds imposed on the vehicle wheels under various driving conditions, e.g. when cornering.

On drives of the aforementioned type, in the event of a zero resisting torque on one of the driven shafts, as occurs in the case of maximum slip on one of the drive axles on the vehicle (e.g. when driving over icy road surfaces), the speed of the other driven shaft is also zeroed with the result that effective tangential forces can no longer be transmitted between the wheels and the road surface.

To overcome this drawback, drives of the aforementioned type are fitted with special couplings designed to connect the two driven shafts when the relative speed of the same is other than zero. Couplings of this type substantially comprise a cylindrical casing housing two sets of discs, each connected to a respective driven shaft, with each disc in one set located between a pair of discs in the other. The discs are provided with appropriate perforations and slots, and the casing filled with a special silicone fluid so that, in the event of relative rotation of the discs in the said two sets, resulting from a difference in the speed of the two shafts, the said fluid is drawn out and heated, with the result that its physical characteristics, in particular viscosity, are altered. Consequently, the torque transmittable by the coupling increases alongside an increase in the difference between the speeds of the two driven shafts, so as to transmit the torque on the rotary driven shaft to the fixed one, and from the wheels to the road surface, and so restore normal road holding conditions.

Drives of the aforementioned type present a number of drawbacks.

Firstly, torque transmission from one to the other of the said driven shafts is fairly sudden, thus resulting in off-balancing and possible swerving of the vehicle. The reason for this is that the relationship between the torque transmitted by the coupling and the speed of the drive shaft controlling rotation of the same presents, throughout, a derivative which decreaess alongside an increase in the said speed of the shaft. Furthermore, should the coupling be activated for more than a few tens of seconds, it may actually lock, with the result that the two driven shafts are locked integral with each other, which situation may lead to serious off-balancing and swerving of the vehicle. The reason for this lies in the increase in the pressure of the silicone fluid caused both by heating during operation and the fact that the casing on the coupling is filled almost to maximum capacity.

SUMMARY OF THE INVENTION

The aim of the present invention is to provide a drive of the aforementioned type designed to overcome the aforementioned drawbacks, i.e. in the event of one of the driven shafts being arrested as a result of maximum slip on the other driven shaft, the torque of the latter is transmitted gradually and steadily to the former; which characteristic of the coupling is maintained substantially unchanged even after prolonged operation, thus substantially preventing the two driven shafts from being rendered integral with each other.

With this aim in view, according to the present invention, there is provided a drive for transmitting motion between a drive shaft and a pair of driven shafts, in particular, the front and rear drive shafts of a motor vehicle, said drive comprising a power dividing unit located between the said drive shaft and the said driven shafts and designed to transmit the torque on the said drive shaft to each said driven shaft in such a manner that the torques acting on each of the same fall within a given torque ratio and such as to control the said two driven shafts at speeds depending on the operating conditions of the members connected to the said shafts themselves; characterised by the fact that the said two driven shafts are interconnected directly by a hydraulic coupling substantially comprising at least a first rotary member connected to one of the said driven shafts, at least a second rotary member connected to the other said driven shaft, and a tank for a hydraulic fluid; each of the said rotary members being provided with fluid conveying means designed to circulate the said hydraulic fluid centrifugally between the fluid conveying means on the other said rotary member when the speed of one of the said driven shafts differs from that of the other, so as to transmit, via the said hydraulic coupling, a torque increasing alongside an increase in the difference between the said two speeds of the said two driven shafts.

BRIEF DESCRIPTION OF THE DRAWINGS

The drive according to the present invention will now be described, by way of example, with reference to the attached drawings, in which.

DETAILED DESCRIPTION OF THE INVENTION

Figure 1:
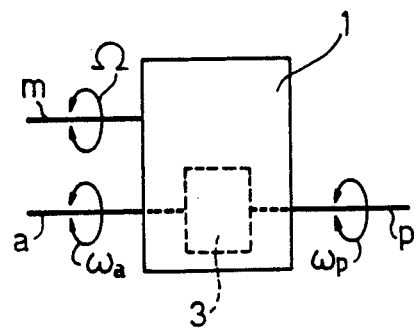
FIGS. 1 and 2 show schematic views of the drive according to the present invention.

The drive according to the present invention may be illustrated as shown in FIG. 1. Substantially, it comprises a drive shaft 'm', pair of driven shafts 'a' and 'p', and a power dividing unit indicated as a whole by 1 and located between the said drive shaft and the said driven shafts, so as to transmit the torque on the former to the latter. The said power dividing unit must be designed to give a given ratio between torque Ca on shaft 'a' and torque Cp on shaft 'p', regardless of the rotation speed of the said shafts, and to give speeds Wa and Wp of the two driven shafts depending on the operating condition of the members connected to the shafts themselves. For example, if the said members are the front and rear axles of a twin drive axle motor vehicle, the said speeds depend on the speeds of the axles themselves, in turn, depending on the driving condition of the vehicle (straight trajectory or cornering). As explained in more detail later on, a power dividing unit of the aforementioned type may be an epicyclic train or differential mechanism.

The drive according to the present invention also comprises a hydraulic coupling, indicated as a whole by 3 and described in more detail later on, which connects shafts 'a' and 'p' directly as shown in FIG. 1.

Figure 2:
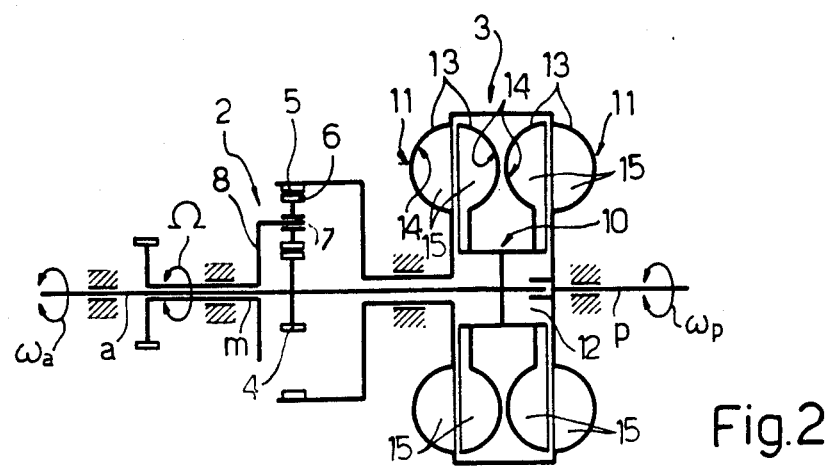

As shown in FIG. 2, power dividing unit 1 may consist of an epicyclic train 2 substantially comprising a pair of coaxial sun gear 4 and ring gear 5 between which are located planet gears 6 turning on pins 7 of a train carrier member 8. In the FIG. 2 embodiment, drive shaft 'm', which, in this case, is a hollow shaft, is connected directly to train carrier member 8, whereas driven shafts 'a' and 'p' are connected to sun gear 4 and ring gear 5 respectively.

Hydraulic coupling 3 is a standard known type substantially comprising at least a first rotary member 10 (FIG. 2) connected to one of the said driven shafts, e.g. shaft 'a'; at least a second rotary member 11 connected to the other said driven shaft, e.g. shaft 'p'; and a tank 12 for a hydraulic fluid. Each of the said rotary members 10 and 11 presents fluid conveying means 13 designed to circulate the said hydraulic fluid centrifugally between the said fluid conveying means of the other said rotary member, so as to transmit a torque from the said first to the said second rotary member.

The said fluid conveying means 13 conveniently comprise substantially annular cavities 14 defined by suitably shaped walls housing radial fins 15, which fins 15 define, together with the said walls, substantially closed routes in which to circulate the said fluid, and lie in substantially diametrical planes of the said coupling.

Figure 3:
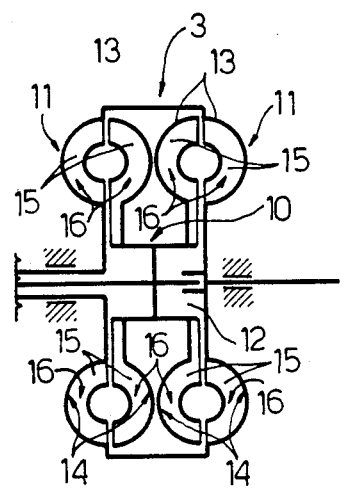
FIG. 3 shows a schematic view of a hydraulic coupling employed on the drive according to the present invention and differing from that of FIG. 2.

As shown in the FIG. 3 embodiment, the said conveying means may, on the other hand, comprise curved-axis channels 16 defined between pairs of suitably shaped annular walls and designed to convey the said fluid between one said rotary member and the other. The axes of the said channels lie substantially in radial planes of the said coupling.

Figure 5:
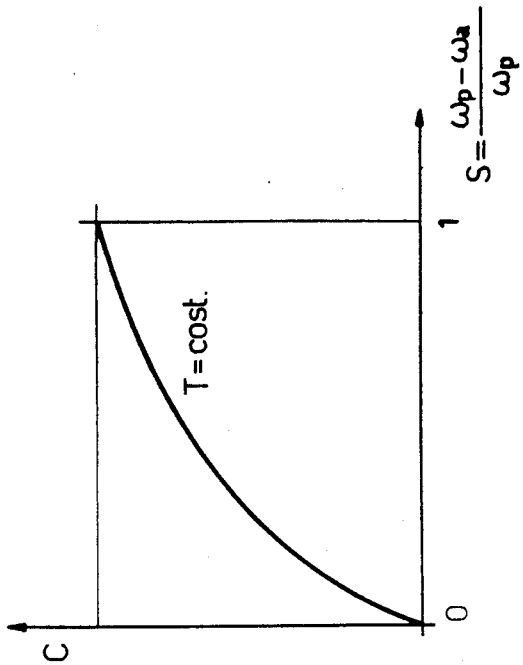
FIGS. 5 and 6 show two characteristics of the hydraulic coupling on the drive according to the present invention.

A hydraulic coupling of the aforementioned type presents the characteristic shown on the FIG. 5 graph, which shows the torque C transmitted by the coupling as a function of slip 's' defined as follows:

$$s = \frac{Wp - Wa}{Wp}$$

wherein Wa and Wp represent the speeds of driven shafts 'a' and 'p' respectively. As shown on the FIG. 5 graph, which was plotted assuming a substantially constant operating temperature of the coupling, the torque transmittable by the coupling increases from zero to maximum between slip 0 (Wa=Wp) and 1 (Wp=0). For demonstrating the performance of the drive according to the present invention, however, the transmitted torque curve should be examined, not as a function of slip, as on the FIG. 5 graph, but as a function of the input speed on the coupling, i.e. speed Wp. For a given slip 's', a precise relationship exists between the torque transmitted by the coupling and input speed, as shown by way of example on the FIG. 6 graph. For a given slip value 's', the increase in transmittable torque C produced by a given increase in input speed (Wp) increases alongside an increase in the speed itself. On the FIG. 6 graph, $\Delta C_1$ and $\Delta C_2$ indicate two different increases in transmittable torque selected at two points on the curve and both relative to the same increase $\Delta Wp$ in input speed. As $\Delta C_2$ is considerably greater than $\Delta C_1$, it follows that the derivative dc/dwp increases alongside an increase in Wp.

Figure 6:
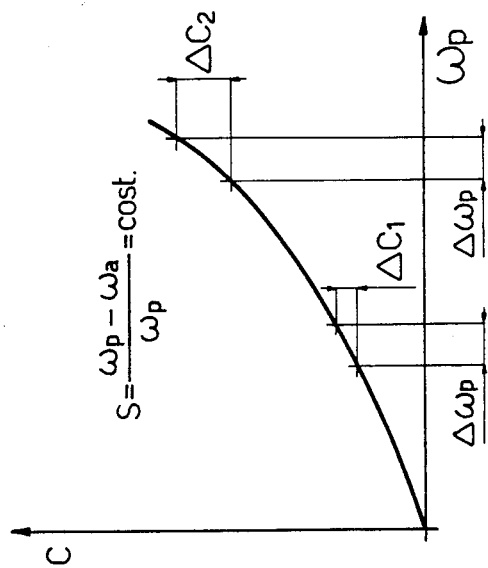

The same curve as in FIG. 6 would be obtained by plotting transmittable torque as a function of the operating time of the coupling, the said operating time being proportional to input speed Wp.

Though the drive according to the present invention may be applied to any type of device or machine, it is particularly suitable for controlling the front and rear drive axles of a motor vehicle. in this case, shafts 'a' and 'p' are connected in any appropriate manner, e.g. by means of respective differentials, to the said axles, whereas drive shaft 'm' is connected to the gearbox.

Though, in the FIG. 2 and 3 embodiments, coupling 3 is a two-stage type (each rotary member 10 and 11 comprising a pair of cavities 14 having respective fins 15), it may be a single-stage type, i.e. on which each of the said members presents only one cavity 14.

The drive according to the present invention operates as follows.

Assuming the said drive is employed for controlling the front and rear drive axles of a motor vehicle, under normal operating conditions, the drive imparted by shaft 'm' is transmitted by the gearbox to power dividing unit 1, which, if consisting of an epicyclic train as shown in FIG. 2, divides torques Ca and Cp on shafts 'a' and 'p' respectively as follows:

$$Ca/Cp = ra/rp$$

wherein ra and rp represent the respective radii of sun gears 4 and 5. As is known, the above ratio is maintained constant regardless of the ratio between speeds Wa and Wp of the said driven shafts, which speeds are related to the speed $\Omega$ of drive shaft 'm (and, consequently, also of train carrier 8 of epicyclic train 3) according to the following equation (Willis formula):

$$\frac{Wp - \Omega}{Wa - \Omega} = -\frac{rp}{ra}$$

As such, shafts 'a' and 'p' may each turn at the speed imposed by the vehicle wheels. Consequently, when traveling along a straight trajectory, the speeds of both shafts are the same, whereas, when cornering, the said speeds differ slightly as permitted by coupling 3.

In the event of maximum slip on the wheels of one of the vehicle axles, for example, when driving over icy road surfaces, the speed of the respective driven shaft increases immediately, whereas that of the other drops down to zero, in which case, coupling 3 transfers the torque on the rotary shaft to the fixed one, so as to restore normal driving conditions. In fact, supporting for the sake of simplicity, that coupling 3 is operated under substantially constant slip conditions, the torque transmitted by the coupling (i.e. transferred from the faster to the slower shaft) increases as a function of the input speed on the coupling, as shown by the curve on the FIG. 6 graph. As shown clearly by the gradual increase in the slope of the said curve, the said coupling operates smoothly and gradually, thus preventing any off-balancing which might result in swerving of the vehicle. Unlike the aforementioned known coupling employing special silicone fluid, coupling 3, even when operated for relatively prolonged periods, has been found to produce no sharp change in the slope of the transmittable torque/input speed (or transmittable torque/coupling operating time) curve sufficient to rigidly connect the said driven shafts.

Between the said two rotary members 10 and 11, provision may conveniently be made for friction braking means designed to generate a given friction torque between the said members. Such means (not shown) may comprise a pair of rings, each fitted to a respective rotary member, and elastic members consisting of springs designed to push one ring against the other at given pressures. In like manner, instead of ranging from 0 to maximum, as in the previous case shown on the FIG. 6 graph, the torque transmittable by coupling 3 ranges from a minimum value, equal to the friction generated by the said friction means, to the said maximum value. By virtue of such an arrangement, torque transmission between the said two driven shafts would be performed solely by friction, in the case of low torques, and by virtue of the said hydraulic fluid in the case of higher torque values.

Figure 4:
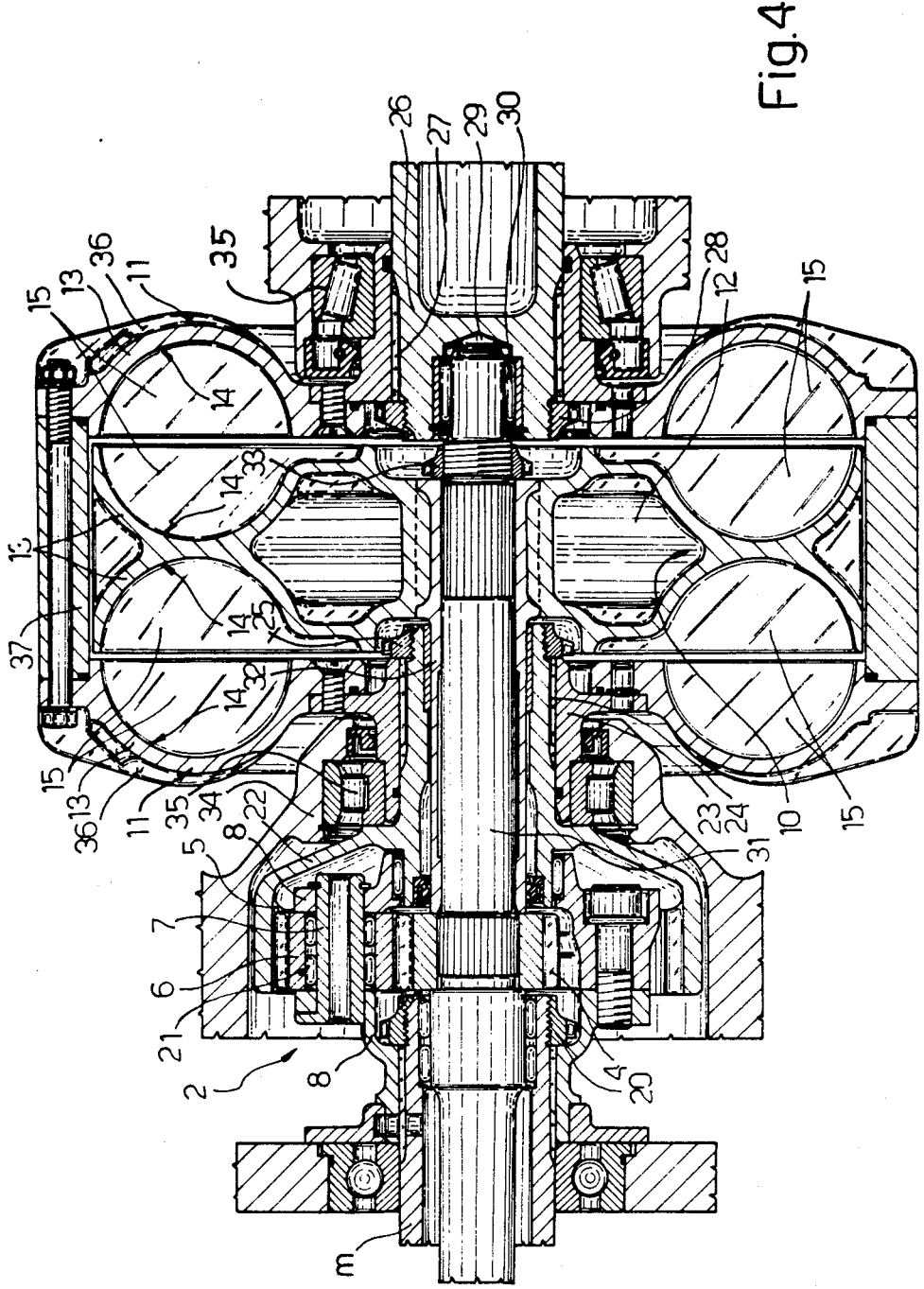
FIG. 4 shows a longitudinal section of the basic components of the drive according to the present invention and employed for controlling the front and rear drive shafts of a motor vehicle.

FIG. 4 shows a construction arrangement, by way of example, of the drive according to the present invention, in which the members common to the FIG. 2 arrangement are indicated using the same numbering system. Train carrier 8 is connected to hollow drive shaft 'm' via a splined coupling and a threaded ring nut 20. Planet gears 6 are supported on respective pins 7 by rollers 21, and the larger-diameter ring gear 5 is connected to rotary member 11 of coupling 3 by a cup-shaped body 22, which fits inside hub 23 of the said rotary member and is connected to the same by a respective splined coupling 24. The said body 22 and rotary member 11 are secured axially by a threaded ring nut 25. On the opposite side to that connected to cup-shaped body 22, rotary member 11 is connected to a sprocket 26 designed for connection to the rear drive shaft on the vehicle; said connection being made by means of a splined coupling 27 and ring nut 28. Inside a cavity on the said sprocket, there rotates, via the interposition of rollers 30, the end of the other driven shaft 31, to which are connected, via respective splined couplings, rotary member 10 and ring gear 5. As shown clearly in FIG. 4, the said rotary member 10 is conveniently integral with a coupling 32 which is connected on shaft 31, rests against ring gear 5, and is locked axially by means of threaded ring nut 33. Rotary member 11 of coupling 3 is supported, in relation to frame 34, on a pair of rolling bearings 35, and may conveniently consist of a pair of disc-shaped elements 36 between which is located a finned annular element 37.

To those skilled in the art it will be clear that changes may be made both to the form and arrangement of the components parts of the embodiment described and illustrated herein without, however, departing form the scope of the present invention.

I claim:

1. A drive for transmitting motion between a drive shaft (m) and a pair of driven shaft (a, p), in particular the front (a) and rear (p) drive shaft of a motor vehicle, said drive comprising:
    (a) an epicyclic train (2) which includes a sun gear (4) and a ring gear (5) between which are located planet gears (6) turning on the pins (7) of a train carrier member (8), the said drive shaft (m) being integral with the said train carrier member (8) and the said driven shaft (a, p) being integral one with the said sun gear (4) and the other with the said ring gear (5);
    (b) a hydraulic coupling (3) which includes at least a first rotary member (10) connected to one of the said driven shaft (a, p), at least a second rotary member (11) connected to the other of the said driven shaft, and a tank (12) for a hydraulic fluid;
    (c) the said first rotary member (10) comprising an annular body having a pair of annular cavities (14) located on opposite faces of the said body and the said second rotary member (11) having a pair of annular bodies (36) each located on one side in relation to the said first rotary member (10) and having an annular cavity (14) facing a respective cavity (14) on the said first rotary member, the said two bodies (36) on the said second rotary member bieng fixedly connected by an annular element (37); and
    (d) said cavities (14) of said bodies defining fluid conveying means designed to circulate the said hydraulic fluid centrifugally when the speed of one of the said driven shafts differs from that of the other, so as to transmit, via the said hydraulic coupling, a torque increasing along side an increase in the difference between the said two speeds of the said two driven shafts in a predetermined ratio.

2. A drive as claimed in claim 1, characterised by the fact that the size and form of the said fluid conveying means (13) on the said rotary member are selected so that, for a given difference in the respective speeds of the said driven shafts (a, p), the transmittable torque increase resulting from a given increase in the input speed on the said coupling increases alongside an increase in the said speed.

3. A drive as claimed in claim 1, characterised by the fact that the said fluid conveying means (13) on the said rotary members comprise radial fins (15) defining closed routes for the said fluid and substantially lying in diametrical planes on the said coupling.

4. A drive as claimed in claim 1, characterised by the fact that the said fluid conveying means (13) on the said rotary members comprise curved-axis channels (16) defining flow channels for the said fulid; the said axes substantially lying in radial planes on the said coupling.

5. A drive as claimed in claim 1, characterised by the fact that the said first rotary member (10) comprises an annular body having a pair of annular cavities (14) located on opposite faces of the said body and each having a number of radial fins (15); and that the said second rotary member (11) comprises a pair of annular bodies (36) each located on one side in relation to the said first rotary member (10) and having an annular cavity (14) facing a respective cavity (14) on the said first rotary member (10) and also having a number of radial fins (15); the said two bodies (36) on the said rotary member being connected by an annular element (37) defining a casing for the said hydraulic fluid tank.

6. A drive as claimed in claim 1, in which one of the said driven shafts (a, p) is the front drive shaft, and the other the rear drive shaft of a motor vehicle, characterised by the fact that the said first rotary member (10) is connected to the smaller-diameter sun gear (4) of the said spicyclic train (2) and to the said front shaft (a), and the said second rotary member (11) is connected to the larger-diameter ring gear (5) of the said epicyclic train and to the said rear shaft (p) on the said motor vehicle; the drive shaft (m) of the said motor vehicle being connected to the said train carrier (8).

7. A drive as claimed in claim 6, characterised by the fact that the said second rotary member (11) is supported, in relation to the frame (34), on a pair of bearings (35); each of the said two annular bodies (36) on the said second rotary member (11) comprising a hub (23); the hub of one of the said bodies being connected to a hollow shaft (22) fitted to the said ring gear (5) and fitted through with the said front shaft (a); and the said hub of the other said annular body housing a bearing (30) for one end of the said front shaft (a).

* * * * *